Oct. 28, 1952 F. S. EVES 2,615,475
WEFT CHANGE BOX MECHANISM FOR LOOMS FOR WEAVING
Filed July 25, 1950 9 Sheets-Sheet 1

FIG. 1.

Inventor:
FREDERICK SYDNEY EVES
By
Richardson, David and Nordon
Attorneys Oct. 28, 1952 F. S. EVES 2,615,475

WEFT CHANGE BOX MECHANISM FOR LOOMS FOR WEAVING

Filed July 25, 1950 9 Sheets-Sheet 3

Inventor:
FREDERICK SYDNEY EVES

By Richardson, David and Nordon
Attorneys

FIG.5.

Oct. 28, 1952     F. S. EVES     2,615,475
WEFT CHANGE BOX MECHANISM FOR LOOMS FOR WEAVING
Filed July 25, 1950     9 Sheets-Sheet 6

Inventor:
FREDERICK SYDNEY EVES

By
Richardson, David and Nordon
Attorneys

Oct. 28, 1952          F. S. EVES          2,615,475

WEFT CHANGE BOX MECHANISM FOR LOOMS FOR WEAVING

Filed July 25, 1950          9 Sheets-Sheet 7

FIG. 9.

Inventor:
FREDERICK SYDNEY EVES

By
Richardson, David and Nordon
Attorneys

Oct. 28, 1952 F. S. EVES 2,615,475
WEFT CHANGE BOX MECHANISM FOR LOOMS FOR WEAVING
Filed July 25, 1950 9 Sheets-Sheet 8

FIG.10.

Inventor:
FREDERICK SYDNEY EVES
By
Richardson, David and Nordon
Attorneys

Oct. 28, 1952  F. S. EVES  2,615,475
WEFT CHANGE BOX MECHANISM FOR LOOMS FOR WEAVING
Filed July 25, 1950  9 Sheets-Sheet 9

Inventor:
FREDERICK SYDNEY EVES
By
Richardson, David and Nordon
Attorneys

Patented Oct. 28, 1952

2,615,475

UNITED STATES PATENT OFFICE 2,615,475

WEFT CHANGE BOX MECHANISM FOR LOOMS FOR WEAVING

Frederick Sydney Eves, Bangor, Northern Ireland, assignor to Munster Simms & Company Limited, Belfast, Northern Ireland Application July 25, 1950, Serial No. 175,731
In Great Britain December 29, 1948

14 Claims. (Cl. 139—171)

This invention relates to weft change box mechanisms for looms for weaving.

An object of the invention is to provide a change box mechanism which is self-contained and can be readily applied to existing looms of various types and sizes.

An embodiment of the invention will now be described, but merely by way of example, with reference to the accompanying drawings in which.

Figure 1:
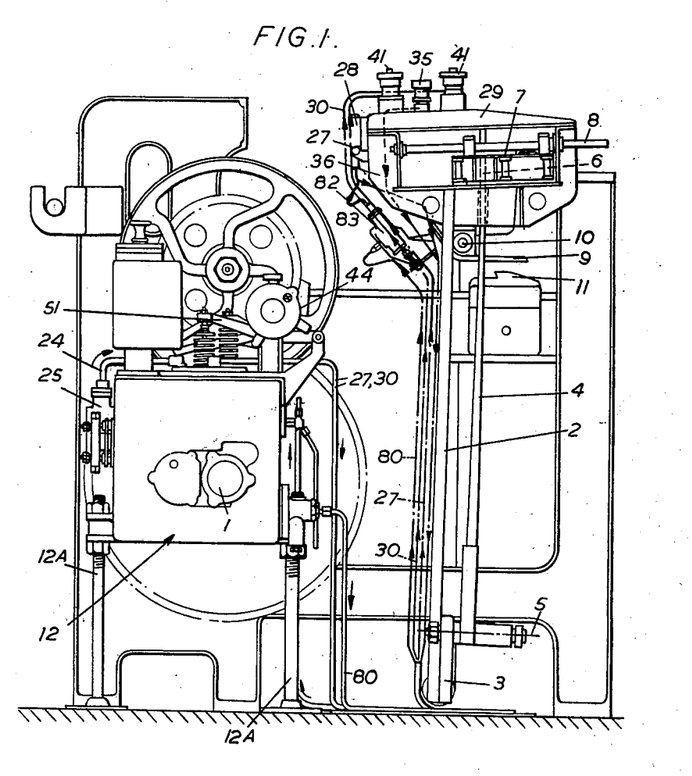
Fig. 1 is a diagrammatic end view of a loom for weaving.
Figure 1A:
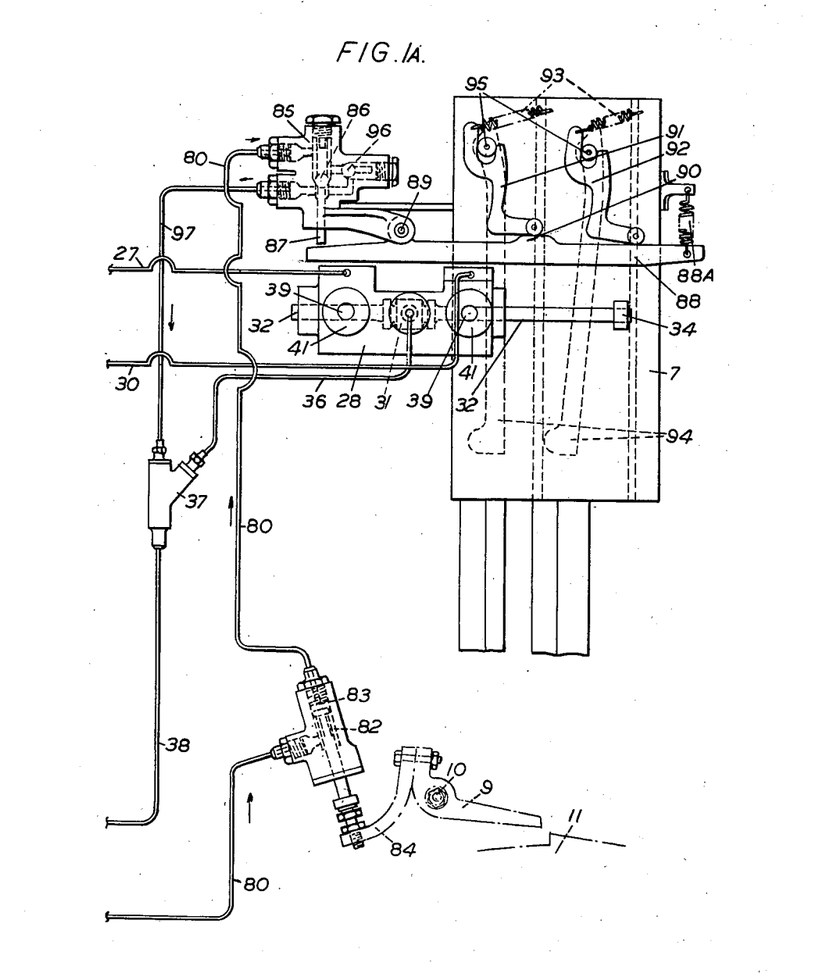
Fig. 1A is a diagrammatic plan view of the change box mechanism on the loom sley.

Referring to the drawings:

The loom (Fig. 1) has a main shaft 1, a sley 2 which oscillates about the axis 3 and a picker arm 4 which oscillates about the axis 5. The picker 6 on the arm 4 engages a shuttle in a two-shuttle change box 7 which is slidable horizontally on guide rods 8 and co-operates with a single-shuttle change box (not shown) at the opposite side of the loom, for two-shuttle operation of the loom. A palm 9 pivoted at 10 on the sley 2 is urged to a position such that during its movement with the sley it contacts an abutment 11 and stops the loom in the usual manner.

Figure 5:
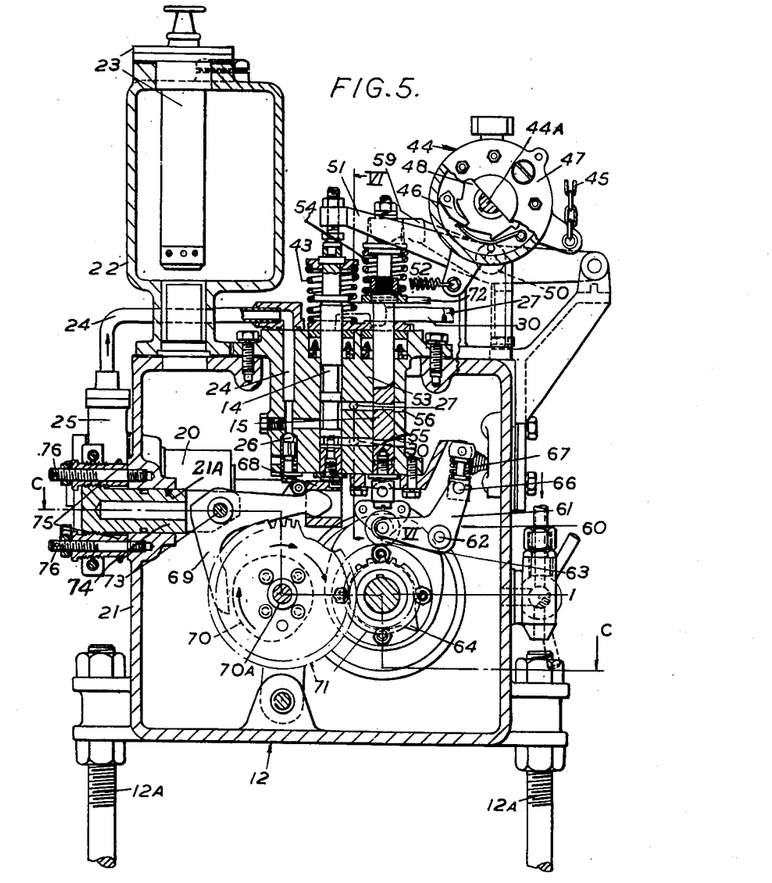
Fig. 5 is a sectional view on the line V—V of Fig. 3.
Figure 8:
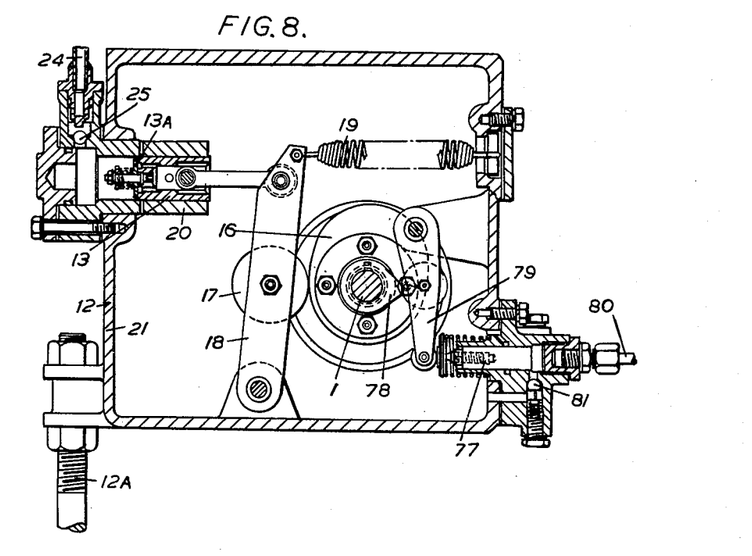
Fig. 8 is a sectional elevation of the hydraulic transmitter.
Figure 9:
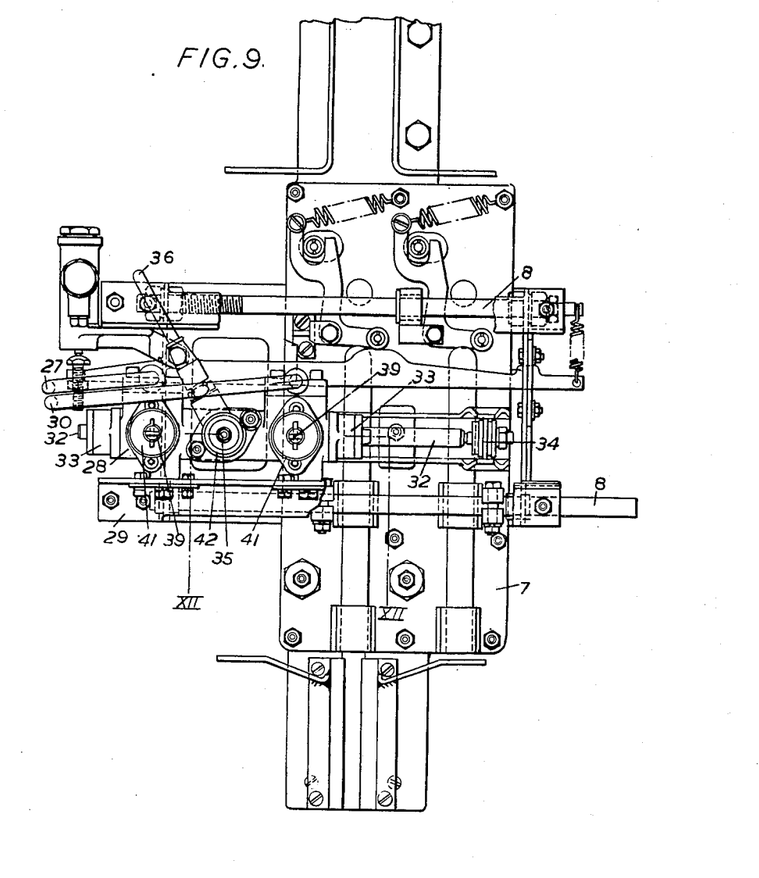
Fig. 9 is a detail plan view of the change box mechanism on the loom sley.
Figure 10:
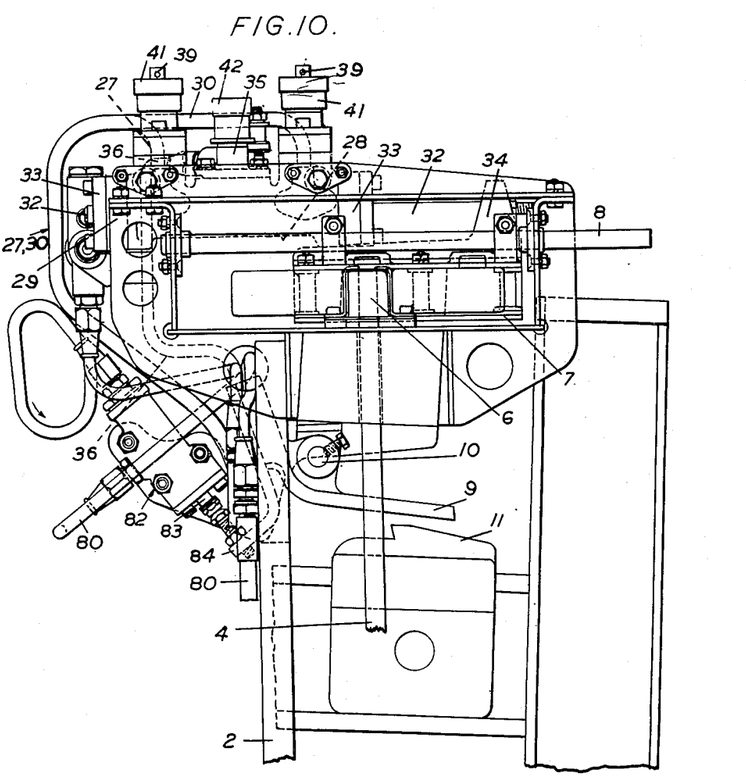
Fig. 10 is an end view of the arrangement of Fig. 9.
Figure 11:
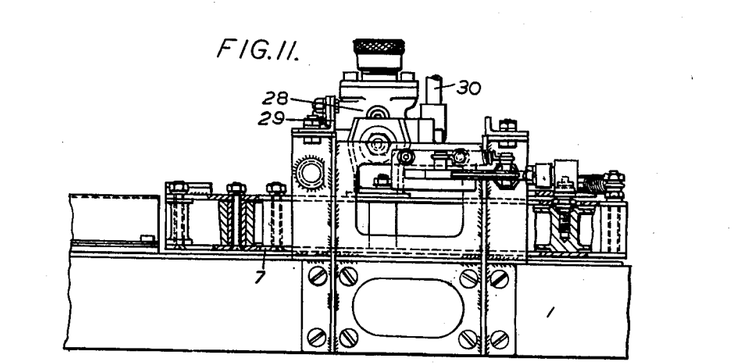
Fig. 11 is a front view of the arrangement of Fig. 9.

Suitably mounted alongside the loom on adjustable leg supports 12A is an hydraulic pump or pulse-transmitter 12 which includes a plunger 13 (Fig. 8), and distributor and disabling valves 14 and 15 respectively (Fig. 5). The plunger 13 (Fig. 8) which has a spring-urged inlet plate valve 13A is actuated by a cam 16 on the loom shaft 1, in synchronism with the loom mechanism, through a follower 17, a lever 18 carrying the follower, and a return spring 19 urging the follower against the cam. The plunger 13 in located in a cylinder 20 immersed in an oil sump or casing 21 subject to the pressure of a compressed air vessel 22 (Fig. 5) located on top of the casing and provided with an air pump 23. The plunger 13 (Fig. 8) sucks oil in from the casing 21 and delivers into a conduit 24 through an outlet check valve 25. The conduit 24 leads to the distributor valve 14 (Fig. 5) and has a relief valve 26 therein. The double-waisted piston of the valve 14 is movable between two positions. In one of said positions communication is effected between the conduit 24 and a conduit 27 leading to one end of a slave cylinder 28 (Figs. 1A, 9, 10 and 12) mounted on the shuttle box carrier 29 with its axis horizontal and lying in the direction of the sley movement. In the other of said positions of the piston of valve 14 communication is effected between the conduit 24 and a conduit 30 leading to the other end of the slave cylinder 28. In the cylinder 28 is a slave piston 31 (Fig. 12) with piston rods 32 projecting through glands 33 at each end of the cylinder 28. It will thus be understood that each pulse or delivery from the transmitter moves the slave piston 31 in one or other direction in accordance with the position of the distributor valve 14. One end of a piston rod 32 is connected at 34 to the slidably mounted shuttle box 7 adapted to contain two shuttles one or other of which is located in picking position depending upon whether the piston 31 is at one end or the other of the slave cylinder 28.

Figures 5A, 6, 7:
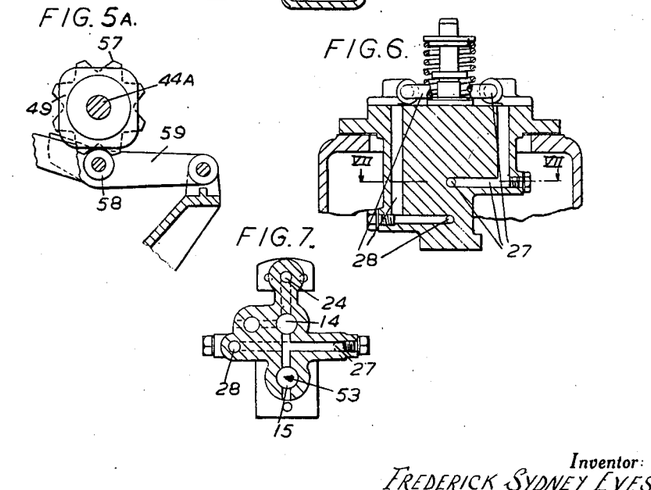
Fig. 5A is a sectional detail of the top right hand corner of Fig. 5.
Fig. 6 is a sectional detail on the line VI—VI of Fig. 5.
Fig. 7 is a sectional detail on the line VII—VII of Fig. 6.

It is important that the slave piston 31 be properly positioned and held at the ends of its cylinder 28. To ensure this the plunger 13 is adapted to deliver more oil to the cylinder 28 than is necessary, the excess oil escaping through a relief valve 35 (Fig. 12), through a conduit 36, through the casing of a light-spring check valve 37 to be described later, and through a conduit 38 to the casing or sump 21. Furthermore, spring-urged detents 39 are provided at each end of the slave cylinder 28, said detents engaging in correspondingly shaped grooves 40 in the piston 31 to hold the piston, and being formed as plungers at 39A so that the effect of the oil pulse is first automatically to disengage the detent from its groove and then move the piston. A screwed lifting cap 41 is also provided whereby the detent 39 can be manually disengaged when it is desired to traverse the shuttle box 7 manually. Inasmuch as the slave cylinder 28 is moved along its axis during the sley movement, the end glands 33 must be such as to prevent the inertia effect on the oil inside from sucking air into the cylinder. The spring-urged relief valve 35 is manually adjustable by means of a handle 42 on top of the cylinder 28 to enable air to be cleared out of the system at the start of operations under the effect of the air pressure on the oil in the casing or sump 21. The distributor piston valve 14 (Fig. 5) is spring-urged at 43 and moved as between the two positions by a square cam and ratchet mechanism 44 (Figs. 5 and 5A) operated from the dobby or equivalent weft control mechanism of the loom through a chain 45. This mechanism 44 is mounted on a shaft 44A and comprises a pawl 46 actuated from the dobby through the chain 45 and casing 47 to cause stepwise rotation of a ratchet 48 and a square cam 49 so that a corner and flat of the cam 49 alternately engage a follower 50 on a pivoted lever 51 which actuates the valve 14. The casing 47 is returned by a spring 52. Each of said outlet passages 27 and 30 in addition to communicating with the slave cylinder 28 also communicates with a bore 53 in the casing of valve 14, said bore 53 containing the slidable disabling valve 15 with two transverse passages 55, and said bore 53 having two relief passages 56 opposite the said two outlet passages 27 and 30. In one position of the disabling valve 15, the transverse passages 55 are in register with the outlet and relief passages 27, 30 and 56, and in this case the pulse from the plunger 13 simply circulates back to the sump 21 without actuating the slave piston 31. In its other position, the disabling valve 15 blocks the outlet and relief passages 27, 30 and 56 so that the pulse from the plunger 13 is transmitted to one or other end of the slave cylinder 28 depending on the position of the distributor valve 14. The disabling valve 15 is controlled by a cam 57 having eight swells and intervening recesses and which is keyed to the shaft 44A so as to be actuated, in unison with the square cam 49, from the ratchet dobby mechanism 44. The cam 57 engages a follower 58 on a pivoted lever 59 which actuates the valve 15 through a lost-motion spring 54. The swells of cam 57 are so disposed that the disabling valve 15 is moved down to blocking position before the pulse passes through the dsitributor valve 14. The disabling valve 15 is then held down in this position by a spring toggle mechanism 60 at itse lower end while the swell of cam 57 moves clear of the follower 58. The toggle mechanism 60 consists of a bell crank lever 61 pivoted at 62, a cam follower 63 on the lever 61 engageable by a cam 64 on the shaft 1, a connection 65 between the valve 15 and the lever 61, and a slidable pin 66 urged into a slot in the lever 61 by a spring 67. After the pulse has been transmitted, the toggle mechanism 60 is knocked up by the cam 64, past its dead-centre position to the holding position shown in the drawing, and the disabling valve 15 is thus lifted to and held in the disabling position by the toggle mechanism, this upward movement being possible because the actuating swell of the disabling valve cam 57 has moved clear and brought the next cam recess into position with respect to the cam follower 58, as shown in Fig. 5A.

The arrangement described above provides a flexible arrangement as regards the sequence of weft shots. The shuttle boxes may be simply alternated or either may be left in position for as many shots as may be desired, by appropriate movement of the cam 57.

The arrangement described is also adapted for an alternative control instead of the dobby mechanism. For mixed weaving wherein the shuttle boxes are simply alternated a dobby mechanism is not required and an alternative simple control is provided as follows:

At the foot of the waisted distributor valve 14 an eye 68 (Fig. 5) is provided for engagement by one end of a bell crank 69 of which the other end is adapted for actuation at half the frequency of the pump pulses by means of a cam 70 mounted on a shaft 70A and driven from the shaft 1 through toothed gearing 71. The disabling valve 15 has a lever 72 at its top end whereby it may be turned either manually or by some loom-actuated mechanism through 90° so that, although the valve continues to be actuated in the manner already described and assumes its upper disabling position, it does not in fact disable the plunger 13 but blocks the outlet passages 27 and 30. Thus, with this arrangement the shuttle boxes are simply alternated. The pivot 73 of the bell crank 69 is carried by a mounting 74 which is slidable in an opening 21A in the casing 21, is positioned relative to the casing by distance pieces 75, and is secured to the casing by screws 76. With the distance pieces in position as shown, one arm of the crank 69 is held clear of the cam 70 without disconnecting the other arm from the eye 68 of the distributor valve 14. By removal of the distance pieces 75 and tightening of the screws 76, the crank 69 is moved into operative association with the cam 70. It will thus be understood that the valve arrangement above described can be readily changed from dobby control to the alternative control or vice versa.

Hydraulic stop mechanism for stopping the loom on failure of the shuttle to enter the box consists of a quick-acting spring return pulse-transmitting plunger 77 (Fig. 8) actuated by a quick-lift cam 78 and rocker 79 and mounted on the casing 21 and driven from the shaft 1 in synchronism with the loom mechanism to deliver a pulse at the time the shuttle should enter the box. The pulse is delivered along a conduit 80 which returns to the sump or oil supply through a relief valve 81 and which has connection with a chamber 82 containing a spring-loaded slave plunger 83 which abuts a tail 84 on the palm 9. This palm 9 is normally urged to a position such that during its movement with the sley arm 2 it contacts the abutment 11 and stops the loom in the usual manner. Beyond its connection with the chamber 82 the conduit 80 passes through a valve casing 85 which contains a check ball valve 86 which is normally held open against spring action by a tappet 87 actuated by a lever 88 pivoted at 89 spring-urged at 88A, and lying across the top of the shuttle box 7. The lever 88 has a projection 90 engageable (according to which shuttle is in operative position) by either of two bell cranks 91, 92, one for each shuttle. These bell cranks 91 and 92 are spring-urged at 93 by springs each stronger than the spring 88A, and are actuable by the shuttle box swells 94 which are actuated by entry of the shuttle into the box 7. The cranks 91 and 92 are connected to the swells 94 by pin and slot connections as at 95, and one or other of the cranks 91, 92 is engaged with the projection 90 depending upon which shuttle is in action, that is, depending upon the position of the box 7. The valve casing 85 also contains a spring-controlled adjustable relief valve 96.

If the shuttle enters the box 7 properly the corresponding bell crank 91 or 92 and the lever 90 are moved to allow the check valve 86 to close under the action of its spring. Thus the pulse of oil from the plunger 77 creates a rise in pressure and actuates the slave plunger 83 against its spring to lift the palm 9 clear of the abutment 11, thus allowing the loom to continue in operation. On the other hand, if the shuttle does not enter the box 7, the valve 86 remains open, so that the oil returns through a conduit 97 and through the check valve 37 and conduit 38, to the casing 21 without actuating the slave plunger 83 and thus the palm 9 engages the abutment 11 and stops the loom.

Figures 12, 13, 14, 15:
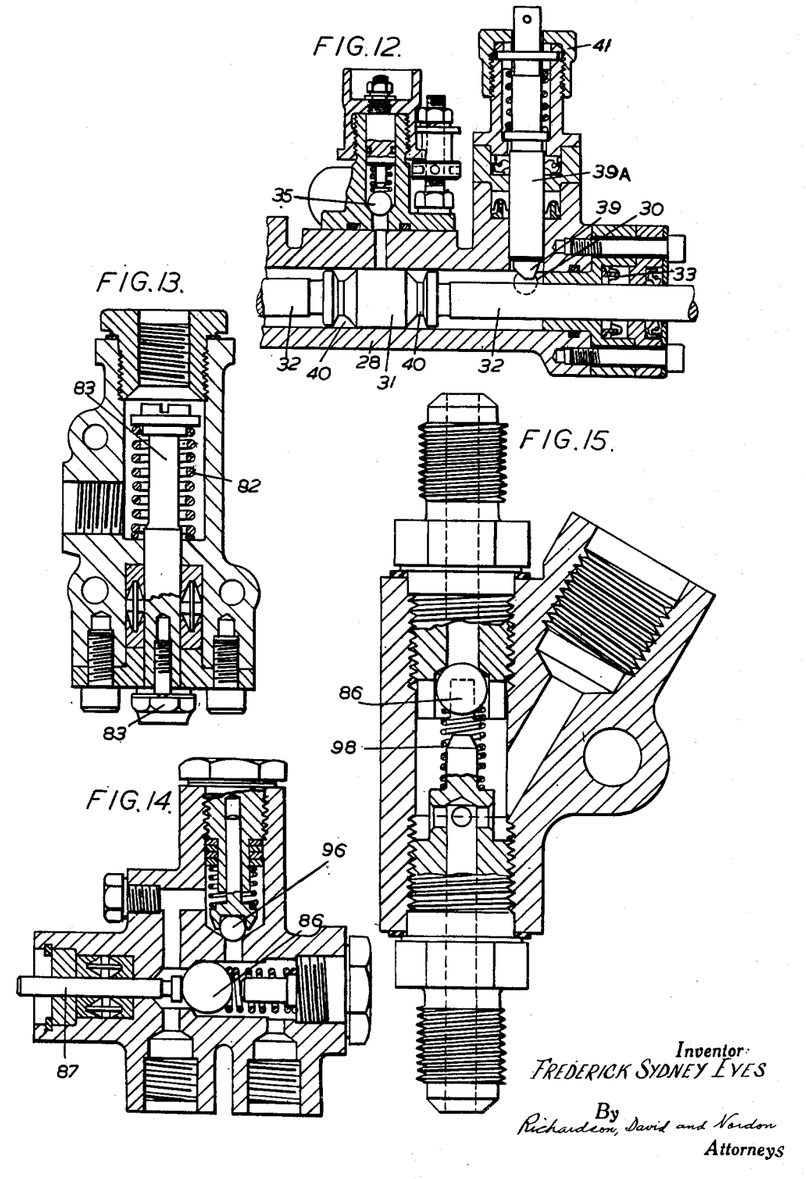
Fig. 12 is a sectional view on the line XII—XII of Fig. 9.
Figs. 13 and 14 are sectional detail views of the loom stop motion mechanism.
Fig. 15 is a sectional view of a return valve for the hydraulic system.

The check valve 37 provided between the stop motion valve 86 and the sump or main casing 26 is controlled by a light spring 98 (Fig. 15).

The various conduits from the transmitter 12 (Fig. 1) are led up the sley 2 and incorporate flexible portions (not shown) to allow the sley movement.

The arrangement described is for two shuttle operation, there being a single-shuttle box at the opposite side of the loom. In a modified form a two-shuttle box 7 controlled as described may be arranged at each side of the loom to enable three-shuttle operation and also for "pick and pick" working.

The hydraulic mechanism as described is readily applicable to various types and sizes of looms because owing to its hydraulic operation it is largely independent of the loom dimensions and is self-contained.

Figure 2:
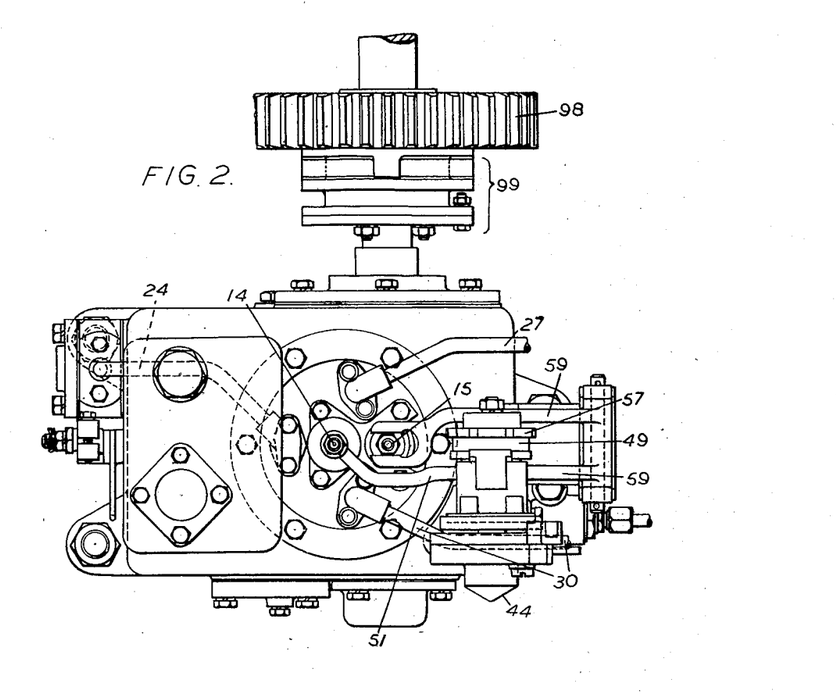
Fig. 2 is a top plan view of the hydraulic transmitter of the change box mechanism.
Figure 3:
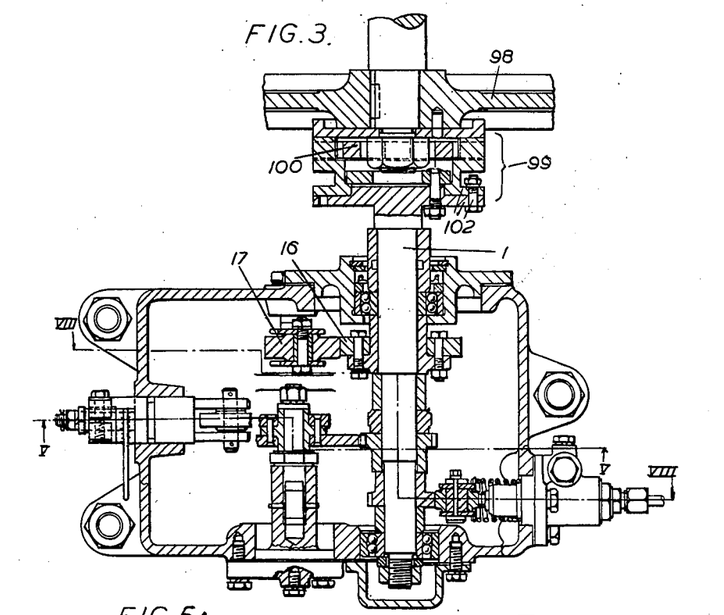
Fig. 3 is a sectional plan view of the transmitter.
Figure 4:
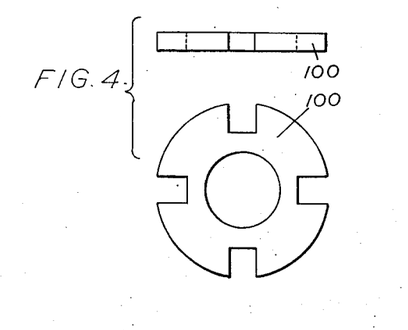
Fig. 4 is a detail view of Fig. 3.

Referring to Figs. 2 to 4, the drive to the shaft 1 is taken from a gear wheel 98 on the loom main shaft through a coupling 99 incorporating a driving ring 100 allowing for a substantial degree of misalignment, and incorporating a fine, angular vernier-type setting adjustment device in the form of a pin 100 extending through flanges 102 having different numbers of pin holes. Thus, timing the mechanism to the loom is simplified.

I claim:

1. A change box mechanism for attachment to a loom, comprising a change box movable to predetermined positions to bring the desired shuttle into register with the picker, a slave piston and cylinder device for moving the box, and hydraulic pulse-supplying means actuable from a part of the loom driven in synchronism with the loom mechanism, for supplying hydraulic pulses to position the slave piston and cylinder device and comprising plunger means for creating the pulses, and distributor valve means located between the plunger means and the slave cylinder and positionable to direct any pulse to either end of the slave cylinder.

2. A change box mechanism according to claim 1, wherein the distributor valve means comprises a distributor valve operatively connected with the weft-control mechanism of the loom.

3. A change box mechanism according to claim 2, wherein the distributor valve means includes a disabling valve positionable to allow any pulse to be supplied to the slave cylinder or to be returned to the source of oil without actuating the slave piston, and operatively connected to the weft-control mechanism of the loom.

4. A change box mechanism according to claim 3, wherein the distributor valve is adapted for alternative operative connection with the driven part of the loom, and the disabling valve is adapted for movement to a non-operative position.

5. A change box mechanism according to claim 4, wherein the alternative operative connection of the distributor valve comprises a bell crank lever cam actuated from the loom shaft and having an arm operatively connected with and slidable relatively to the distributor valve, said lever being movable towards and from an operative position relative to the cam while maintaining operative connection with the distributor valve.

6. A change box mechanism for attachment to a loom, comprising a change box movable to predetermined positions to bring the desired shuttle into register with the picker, a slave piston and cylinder device for moving the box, plunger means for supplying hydraulic pulses to position the slave piston and cylinder device, a distributor valve located between the plunger means and the slave cylinder and positionable to direct any pulse to either end of the slave cylinder, a disabling valve positionable to allow any pulse to be supplied to the slave cylinder or to be returned to the source of oil without actuating the slave piston, and a pair of rotatable control cams operable in unison from the weft-control mechanism of the loom to position respectively the distributor and disabling valves.

7. A change box mechanism according to claim 6, having a toggle device adapted to maintain the disabling valve in blocking position and cam-actuable from the loom shaft to move the disabling valve to, and maintain same in the disabling position.

8. A change box mechanism according to claim 7, wherein the plunger means is adapted to deliver more oil than is necessary to move the slave piston to the other end of the slave cylinder, and a relief valve on the cylinder provides for discharge of the excess oil.

9. A change box mechanism according to claim 8, wherein the slave cylinder has spring-urged detent means for positively holding the slave piston in the end positions, said detent means being adapted for disengagement by the hydraulic pulse which thereafter pushes the piston to the other end of the cylinder.

10. A change box mechanism according to claim 9, wherein the detent means are adapted for manual disengagement.

11. A change box mechanism according to claim 10, wherein the slave piston has piston rods projecting through glands at each end of the cylinder, said glands preventing the inertia effect of the oil for sucking air into the cylinder.

12. A change box mechanism according to claim 11, having a manually operable relief valve on the slave cylinder and having the oil reservoir of the plunger means under air pressure, whereby air may be cleared out of the hydraulic system at the start of operations.

13. An hydraulically actuable control device for the stop mechanism of a loom, comprising hydraulic pulse-supplying means actuable from a driven part of the loom in synchronism with the loom mechanism, slave piston and cylinder means in operative connection with said stop mechanism and said pulse-supplying means, and valve means connected to said piston and cylinder means and actuable in accordance with the presence or absence of the shuttle in the box to control the movement of said piston and cylinder means.

14. An hydraulic control device for an adjustable loom part movable with the sley, for example a change box, said device comprising an hydraulic pulse supplier drivably connectible to the loom, a slave piston and cylinder device mounted on the sley and operatively associated with the adjustable loom part to effect adjustment of said part, conduit means extending from the supplier to said piston and cylinder device and allowing movement of the sley, valve means on the sley for controlling the fluid supply to said piston and cylinder device, and control means for the valve means adapted for actuation on operation of the loom so as to effect adjustment of the loom part when required.

FREDERICK SYDNEY EVES.

REFERENCES CITED

The following references are of record in the file of this patent:

UNITED STATES PATENTS

| Number | Name | Date |
|---|---|---|
| 1,600,378 | Wells | Sept. 21, 1926 |
| 2,247,140 | Twyman | June 24, 1941 |
| 2,332,532 | Roehm | Oct. 26, 1943 |
| 2,416,933 | Lynam et al. | Mar. 4, 1947 |
| 2,425,676 | Hindle | Aug. 12, 1947 |